US010486371B2

(12) United States Patent
Schwab et al.

(10) Patent No.: US 10,486,371 B2
(45) Date of Patent: Nov. 26, 2019

(54) PACKAGING FOR A GROUP OF AT LEAST TWO CONTAINERS MADE OF PLASTICS MATERIAL

(71) Applicant: ERCA, Les Ulis (FR)

(72) Inventors: Dominique Schwab, Versailles (FR); Michel Kervazo, Saint Gervais (FR); Alain Dunan, Etiolles (FR)

(73) Assignee: ERCA, Les Ulis (FR)

( * ) Notice: Subject to any disclaimer, the term of this patent is extended or adjusted under 35 U.S.C. 154(b) by 554 days.

(21) Appl. No.: 14/767,605

(22) PCT Filed: Feb. 14, 2014

(86) PCT No.: PCT/FR2014/050297
§ 371 (c)(1),
(2) Date: Aug. 13, 2015

(87) PCT Pub. No.: WO2014/125224
PCT Pub. Date: Aug. 21, 2014

(65) Prior Publication Data
US 2015/0367566 A1    Dec. 24, 2015

(30) Foreign Application Priority Data

Feb. 15, 2013 (FR) ..................... 13 51309

(51) Int. Cl.
*B65B 61/06*    (2006.01)
*B29C 65/00*    (2006.01)
(Continued)

(52) U.S. Cl.
CPC ............. *B29C 66/21* (2013.01); *B29C 65/30* (2013.01); *B65B 9/042* (2013.01); *B65B 61/06* (2013.01);
(Continued)

(58) Field of Classification Search
CPC .. B29C 66/21; B65B 9/04; B65B 9/00; B65B 61/184; B65B 17/02
(Continued)

(56) References Cited

U.S. PATENT DOCUMENTS 4,409,252 A * 10/1983 Buschkens ............ B65B 31/043
426/316
4,465,541 A * 8/1984 Charpentier ............ B65B 17/02
156/304.1
(Continued)

FOREIGN PATENT DOCUMENTS

EP    0 050 083 A1    4/1982
FR    2 449 604 A1    9/1980
(Continued)

OTHER PUBLICATIONS

Japanese Office Action issued in Application No. 2015-557503, dated Oct. 31, 2017 (2 pages).

*Primary Examiner* — Chelsea E Stinson
(74) *Attorney, Agent, or Firm* — Eversheds Sutherland (US) LLP

(57) ABSTRACT

The containers are thermoformed in groups, filled, and closed. Then, the containers are separated, and placed adjacent to one another in such a manner that segments of their respective rims face each other and define between them a line of separation. On said line, at least one spot weld is formed that forms a breakable connection between the facing rim segments.

12 Claims, 3 Drawing Sheets

(51) Int. Cl.
*B65B 9/04* (2006.01)
*B29C 65/30* (2006.01)
*B29L 31/00* (2006.01)
*B29K 23/00* (2006.01)

(52) U.S. Cl.
CPC ..... *B29K 2023/12* (2013.01); *B29L 2031/712* (2013.01)

(58) Field of Classification Search
USPC .................................. 53/453, 454, 559, 477
See application file for complete search history.

(56) References Cited

U.S. PATENT DOCUMENTS

| | | | | |
|---|---|---|---|---|
| 4,704,844 | A * | 11/1987 | Mancini | B65B 9/042 53/266.1 |
| 5,201,163 | A * | 4/1993 | Reil | B29C 51/00 53/410 |
| 6,964,145 | B1 * | 11/2005 | O'Gallcobhair | A23G 7/0012 53/133.1 |
| 2013/0218245 | A1 * | 8/2013 | Caceres | A61F 7/02 607/114 |

FOREIGN PATENT DOCUMENTS

| | | |
|---|---|---|
| FR | 2 532 240 A1 | 3/1984 |
| GB | 2225566 A | 6/1990 |
| JP | S54-120092 A | 9/1979 |

\* cited by examiner

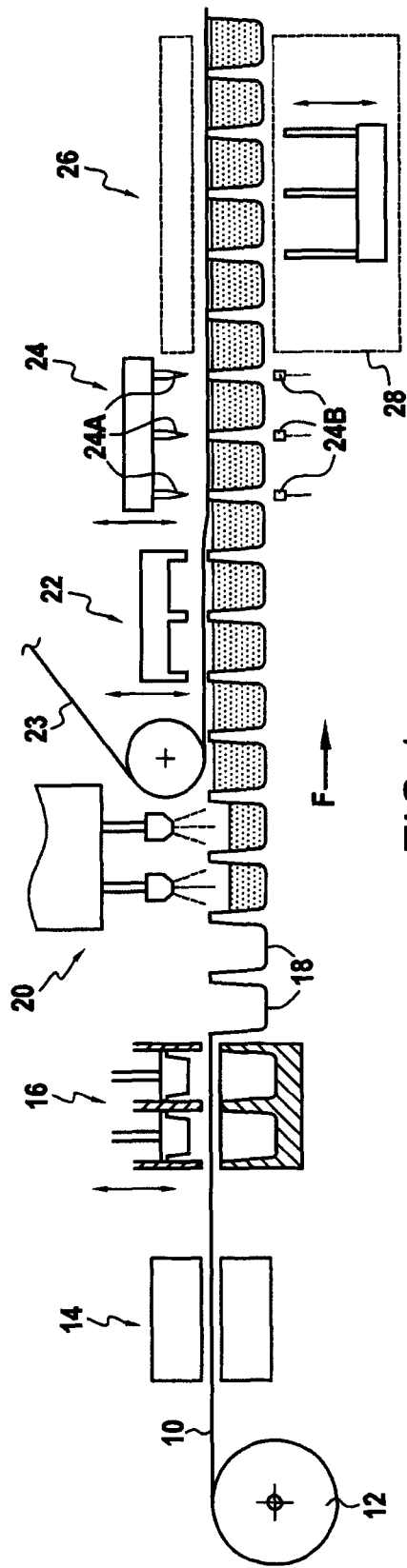
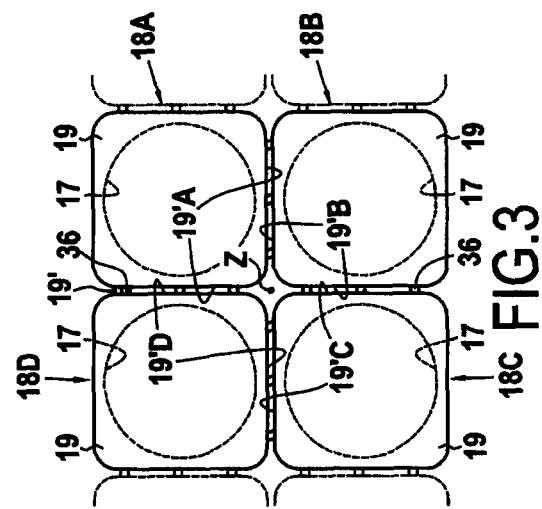
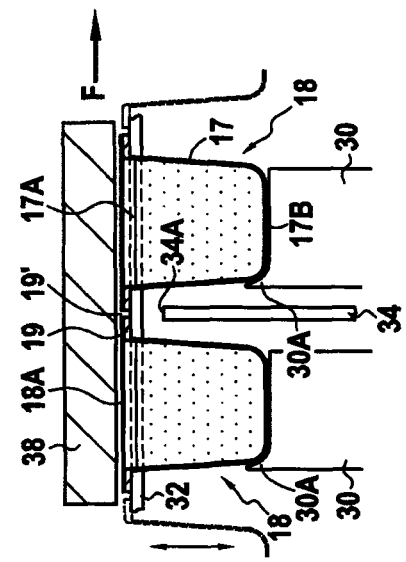

PACKAGING FOR A GROUP OF AT LEAST TWO CONTAINERS MADE OF PLASTICS MATERIAL

TECHNICAL FIELD

The present invention relates to a method of manufacturing containers, in which method a group of at least two containers made of plastics material is provided, each of the containers having a body and a rim.

BACKGROUND OF THE INVENTION

It is known that containers made of plastics materials can be packaged in groups, each group comprising a plurality of containers. In particular, such containers contain foodstuffs, such as yoghurts, compotes, or the like. A first packaging option is to have the containers detached from one another but grouped together in the same packaging, e.g. in a case or in stretch wrapping that holds them together. With such an option, in order to eat or drink the contents of the containers, the user must extract the containers from the case or else remove the wrapping. Such packaging is relatively costly because it requires an external element (case or wrapping). In addition, the handling required of the user is relatively demanding because, for example, once the wrapping has been removed, the containers are no longer grouped together and can no longer be handled as a single unit. In addition, the case or the wrapping constitutes waste.

To overcome those drawbacks, it is known that it is possible to manufacture containers that are connected together via their rims.

Devices for connecting containers made of plastics material together via their rims are known, for example, from Patent Documents FR 2 532 240 A1, DE 199 21 033 A1, and EP 0 050 083 A1. With such devices, containers that are manufactured separately by thermoforming or by injection molding are connected together.

Another possibility is to thermoform the containers from a single sheet of plastics material, with their rims remaining substantially in the initial plane of the sheet. For example, the containers are manufactured from the same sheet that is driven stepwise while being unreeled from a reel, or else the containers are manufactured in groups, each group being made from a sheet or panel of plastics material. To make it easier to separate the containers from one another, nicks or scores are formed in the zones defined by said rims.

Grouped-together containers that are easy to use are thus obtained inexpensively. However, the difficulty lies in how to succeed in breaking the lines along which the rims are connected together. To overcome that difficulty, the thermoplastic material that is chosen is a material that is both thermoformable and also easily breakable. For that reason, such containers are, in general, made of polystyrene. However, polystyrene is relatively expensive and is harmful to the environment to a certain extent, if only because it is difficult to recycle. However, other materials that have the properties required for forming containers, e.g. containers that are suitable for containing foodstuffs, do not necessarily have that capacity to break easily when they are nicked or scored. That applies, for example, to polypropylene.

SUMMARY OF THE INVENTION

For this reason, an object of the invention is to propose a method of forming, filling, and sealing containers, in which method the containers can be grouped together by being connected together, while also enabling the connection to be broken easily, even if the material is not itself easy to break in the way that polystyrene is.

Therefore, the invention provides a method of forming, filling, and sealing a group of at least two containers made of plastics material, which method consists in: thermoforming containers from the same sheet of plastics material, each of which containers has a body and a rim that defines an opening; filling the containers; closing the containers by placing lids across their openings; and separating the containers by cutting them out individually from the sheet; and, after the containers have been separated, the method further consists in: placing the containers adjacent to one another in such a manner that segments of their respective rims face each other and define between them a line of separation between the adjacent containers; and, on the line of separation, forming at least one spot weld forming a breakable connection between the facing rim segments.

Thus, compared with a conventional method of manufacturing containers by thermoforming them from material such as polystyrene, instead of merely forming nicks or scores between the rims of the adjacent containers, said rims are cut in such a manner as to fully separate the containers from one another. Then, in the method of the invention, one or more spot welds are formed on lines of separation between the adjacent containers that it is desired to group together.

With the invention, it is chosen to have containers that are initially separate from one another, while also placing them in such a manner that segments of their rims face one another and, in practice, touch one another, since the distance between the facing rims is almost zero. For example, the containers may be made by thermoforming from the same sheet of thermoplastic material, and then be separated from one another by being cut out from said sheet.

Starting from containers initially manufactured in groups and then separated, the invention chooses to form one or more spot welds between them. Looking, in particular, at the situation when containers are thermoformed from the same sheet of polypropylene, the Applicant has observed that such spot welds are more easily breakable than connections remaining in the sheet after mere partial cutting along fractions of the outlines of the container rims. In the meaning of the present description, the term "breakable" is used to describe the possibility of causing a break without using a tool and while exerting a small manual force. The term "break" is to be understood to have the same meaning.

In the meaning of the present invention, the term "spot weld" is to be understood to mean a highly localized zone, of length that is short compared with the length of the outlines of the rims.

In an implementation, with the rim of each container defining an opening, said at least one spot weld is formed on the line of separation between the adjacent containers, from those faces of the rims of said containers that face in the direction that is opposite from the direction in which their openings face.

To separate the containers having openings, the tendency is to cause them to pivot relative to each other by moving their openings towards each other. The Applicant has observed that, by forming the spot welds from that face of each rim that faces in the direction opposite from the direction in which the opening faces, the spot weld is subjected to traction forces that are maximized during such pivoting, so that breakage is facilitated. In addition, the spot weld is invisible or almost invisible from the face in which the opening is situated, which face is generally the face that is more visible. Furthermore, if the openings in the containers are closed by a lid or by a membrane seal at the time at which the spot weld is formed, the presence of said lid or seal does not hinder forming the spot weld.

In an implementation, the spot weld extends over only a fraction of the thickness of the facing rims.

Provision is thus made so that, when it is sought to separate two adjacent containers by pivoting them, the edges of their respective rims that are situated in register with spot weld(s) can serve as thrust points forming a lever axis that facilitates breakage of the spot weld.

In an implementation, the spot weld is formed by locally melting the plastics material.

Thus, the weld is formed without any addition of external material, and in very simple and inexpensive manner.

In an implementation, the plastics material comprises polypropylene.

Polypropylene offers an advantage from economical and environmental standpoints. By means of the invention, it is possible to make grouped-together containers of polypropylene, while also enabling said containers to be separated by breaking the spot weld(s) that connect them together.

In an implementation, the lids are membrane seals placed over the openings of the containers in a continuous strip, and the seals are cut out while the containers are being separated.

The invention also provides an installation for forming, filling, and sealing containers.

As indicated at the beginning of the present text, it is known that it is possible to group together containers that are initially separate, by putting them in a case or by wrapping them in stretch wrapping. From another piece of prior art, it is known that it is possible to preserve connections between the rims of the adjacent containers, by defining said rims merely by nicking or scoring the plastics material. In view of the above-mentioned drawbacks of that prior art, an object of the invention is to propose an installation that makes it possible to obtain breakable links between grouped-together containers in simple and economical manner.

Thus, the installation of the invention for forming, filling, and sealing containers comprises: a thermoforming station suitable for thermoforming containers from a sheet of plastics material, each of which containers has a body and a rim that defines an opening; as well as a conveyor for conveying the thermoformed containers in groups of at least two adjacent containers connected together via a portion of the sheet; a filling station for filling the containers; a sealing station for closing the containers; and a cutting station suitable for cutting out the containers individually from said sheet so as to separate them; and, downstream from the container cutting station in the direction in which the containers are conveyed, the installation further comprises means for placing the adjacent containers of the group in such a manner that segments of their respective rims face each other and define between them a line of separation between the adjacent containers, and in that it further comprises a welding tool suitable for forming at least one spot weld forming a breakable connection between the facing rims on the line of separation.

Thus, the installation of the invention makes it possible to form one or more spot welds between the facing rims of the initially separate adjacent containers, in order to enable them to be connected together in breakable manner. The welding tool is integrated into a "form-fill-seal" type installation for forming, filling, and sealing the containers. It constitutes merely a station that is simple to install, without any significant extra cost.

In an embodiment, the installation has at least one welding electrode and means for applying said electrode against those faces of the rims of the containers that face in the direction opposite from the direction in which their openings face.

In an embodiment, the installation has at least two welding electrodes that are spaced apart.

In an embodiment, the installation has means for maintaining the groups of containers separate in such a manner that, for each group, the facing rims of the containers are accessible via their faces that face in the direction opposite from the direction in which the openings of the containers face.

In an embodiment, the lids are membrane seals placed over the openings of the containers in a continuous strip, and the cutting station is suitable for cutting out the seals while the containers are being separated.

BRIEF DESCRIPTION OF THE DRAWINGS

The invention can be well understood and its advantages appear more clearly on reading the following detailed description of an embodiment shown by way of non-limiting example. The description refers to the accompanying drawings, in which:

FIG. 1 is a diagrammatic view of an installation for manufacturing containers, which installation includes the device of the invention and makes it possible to implement the method of the invention;

FIG. 2 shows two containers as grouped together, while a spot weld is being formed on the lines of separation between the containers;

FIG. 3 is a plan view of a group of four containers obtained in accordance with the invention;

DETAILED DESCRIPTION

Figure 4:
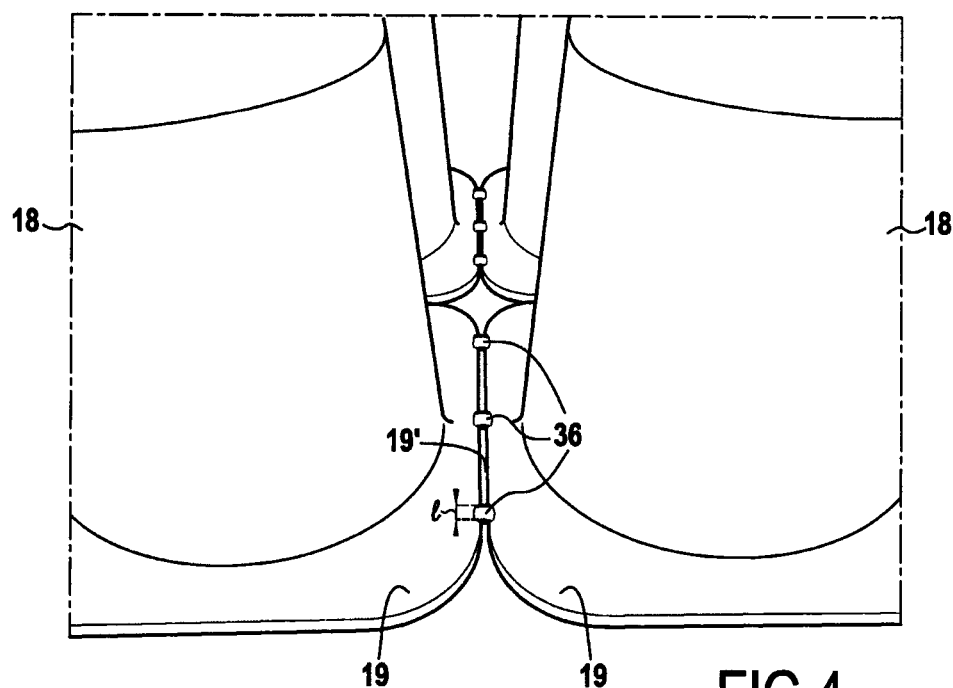
FIG. 4 is an enlargement showing the spot welds between the facing rims of two containers.

Firstly, the container-manufacturing installation shown diagrammatically in FIG. 1 is described. This installation comprises, disposed in succession in the direction F in which a strip 10 of thermoplastic material advances as it is unreeled from a reel 12, a heater station 14 in which the thermoplastic material is heated to a temperature enabling it to deform plastically, a thermoforming station 16, in which containers 18 are thermoformed from the thermoplastic strip 10, a filling station 20 for filling the containers, a sealing station 22 for closing the containers, a cutting station 24 for cutting out the containers, and a packaging device 26.

In the example shown, the containers are thermoformed from a continuous strip 10. In the meaning of the present description, it will be considered, generally, that the containers are thermoformed from a sheet of thermoplastic material. This sheet may be in the form of a continuous strip, as shown in FIG. 1, or else in the form of a panel from which the containers are thermoformed individually or in groups. Naturally, if the containers are thermoformed individually, the cutting station 24 is not always necessary except, possibly, for cutting out the membrane seals that close the containers if, as in the example shown in FIG. 1, the seals are placed over the openings of the containers in a continuous strip 23.

The containers are, in particular, suitable for containing a foodstuff, such as yoghurt, compote, or the like. Thus, the filling station 20 injects such a foodstuff into the containers, in the desired proportions.

Although FIG. 1 shows, in the station 22, the containers being closed by lids from a continuous strip 23, it is naturally possible to provide other types of sealing station, e.g. stations placing individual lids across the openings of the section.

In conventional manner, the cutting station 24 comprises cutting blades 24A and a counter-tool 24B that co-operates with the faces of the rims of the containers that face away from the cutting blades 24A. As can be seen more clearly in FIGS. 2 and 3, each of the containers 18 comprises a body 17 and a rim 19. In general, the rim is situated in the plane of the sheet in which the containers are thermoformed, the material being substantially not drawn in this zone during the thermoforming.

On exiting from the cutting station 24, the containers are conveyed to the packaging device 26 by a conveyor 28 suitable for conveying them individually. For example, a conveyor of the "walking beam" type is used. In conventional manner, such a conveyor includes firstly means for supporting the containers and secondly transport means that take hold of the containers and that carry them forward over one step and then put them down on supports disposed in a downstream region.

By way of example, FIG. 2 shows transport blocks 30 on which the bottoms 17B of the containers can stand, the bottoms of the containers being opposite from their openings 17A. In this example, these blocks have heels 30A that are upturned slightly against the upstream side walls of the containers so that, by advancing in the downstream direction F, the blocks move the containers that they carry with them. In this example, the supports are formed by rails 32 that are parallel to the advance direction F, on which rails the rims of the containers rest. Since electrodes 34 need to pass through the central rail 32 to move closer to the rims of the containers for the purpose of performing their welding function, said rail is provided with through holes 33 through which said electrodes 34 pass.

When, as in the example shown in FIG. 1, the containers are thermoformed from a continuous strip, the installation can have a first conveyor of the gripper conveyor type or the like advancing stepwise, so as to cause the strip 10 to advance as a whole and then, as from the outlet of the cutting station 24, have a conveyor of the type shown at 28 that can transport individual containers, preferably by keeping them grouped together. To this end, the walking beam conveyor is an example of a conveyor that is possible. To simplify the drawings, the first conveyor is not shown in FIG. 1.

In FIG. 2, it can be understood that, in the packaging device 26, grouped-together containers 18 are placed in such a manner that segments of their respective rims 19 are situated facing one another while defining a line of separation between them. This placement is clearly visible in FIG. 3, for a group of four containers, 18A to 18D. It can be seen that the segments 19'A of the rim 19 of container 18A respectively face a segment 19'B of the rim of container 18B and a segment 19'D of the container 18D. Another segment 19'B of the rim of container 18B faces a segment 19'C of the rim of container 18C, which has another of its segments 19'C facing another segment 19'D of the rim of container 18D. The various facing segments are disposed edge-to-edge, while touching each other or almost touching each other, i.e. the width of the line of separation 19' between two facing rim segments is extremely small, or even almost negligible.

While the containers are held in this manner, in accordance with the invention, spot welds are formed in such a manner as to interconnect two containers whose rim segments are facing each other. In the example shown in FIG. 3, for each line of separation between two facing rim segments, three spot welds 36 are formed. Naturally, it is possible to provide a different number of spot welds. However, it is advantageous to have at least two spot welds spaced apart along the line of separation.

In the meaning of the present invention, a "spot weld" is a highly localized zone, in which, by welding, a bridge is established between the facing rims of two containers. The length l (see FIG. 4) of each of these spot welds, as measured along the lines of separation, is small. In general, it lies in the range 1 millimeter (mm) to 12 mm, preferably in the range 2 mm to 7 mm, and even more preferably in the range 3 mm to 5 mm. The area of each of the zones constituting the spot welds corresponds to the area of the head 34A of each of the welding electrodes. For example, said head has an outline that is circular, oval, or indeed square or rectangular. The length f indicated above may thus be the diameter of a weld zone, or indeed its transverse or longitudinal direction. The area of the weld zone may advantageously be less than 150 square millimeters ($mm^2$), and preferably approximately in the range 10 $mm^2$ to 50 $mm^2$.

With reference to FIG. 2, it is recalled that, in the example shown, the conveyor 28 includes firstly transport blocks 30 and secondly supports 32 for the containers. It can be observed in FIG. 2 that the device also includes a holding plate 38 that co-operates with the containers on the side opposite from the blocks 30. Thus, when the containers are held grouped-together so as to be connected together in the packaging device, they are sandwiched between the blocks 30 and the holding plate 38. At this stage, the electrodes, which pass through the supports 32 if necessary, move closer to the rims of the containers in order to form the spot welds. In the example shown, the spot welds are formed on the lines of separation 19' between the containers starting from the bottom faces of the rims 19, i.e. from those faces of said rims that face in the direction opposite from the direction in which the openings 17A of the containers face, which openings are themselves covered by the lids 18A.

Figure 5A:
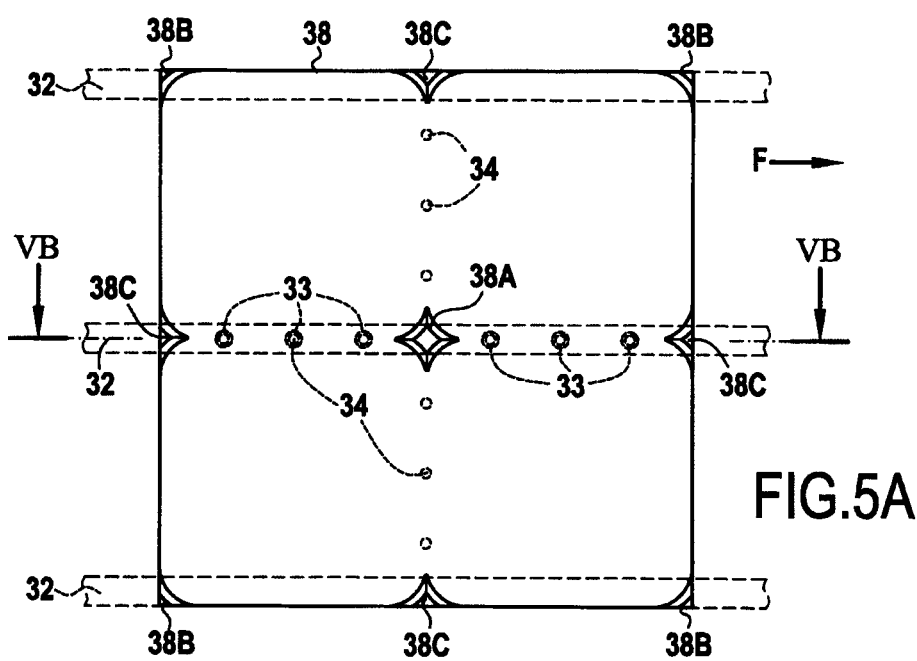
FIG. 5A is a plan view of a portion of the packaging device.

FIG. 5A is a plan view of the holding plate 38 as seen from above. Its bottom surface is suitable for co-operating with the top faces of the containers, at least in the region of the rims of said containers, not only for holding the containers but also for forming a counter-tool for the welding electrodes 34.

Figure 5B:
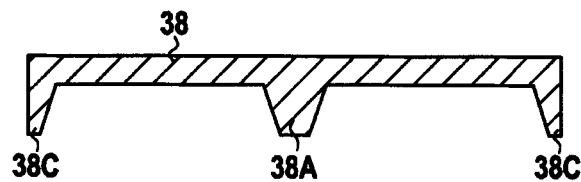
FIG. 5B is a fragmentary view in section on line VB-VB of FIG. 5A.

In addition, the bottom face of the plate 38 may be arranged in such a manner as to center the containers of the same group and to hold them laterally. To this end, the plate 38 has a plurality of centering members. Firstly, these members include a centering core 38A that projects under the bottom face of the plate 38 to co-operate with the free zone Z between the rims of the four adjacent containers visible in FIG. 3. Secondly said centering members include centering ramps 38B that are disposed at the corners of the plate 38, and centering ramps 38C that are disposed on the sides of said plate, to co-operate with corners of the rims of the containers that are situated on the outer periphery of the group of containers. In the section view of FIG. 5B, it can be seen that the centering cores 38A and the centering ramps 38B and 38C have shapes that taper going away from the bottom face of the plate 38, so as to facilitate centering. If a plurality of adjacent plates 38 are considered together, their adjacent centering ramps 38B or 38C, as considered together, form a centering core of shape analogous to the shape of core 38A.

FIG. 5A also shows the positions of the welding electrodes 34 and the arrangement of the transport blocks 30 and the supports 32. The transport blocks 30 are driven by any suitable means, e.g. by being carried by actuators making it possible for them to be moved vertically and horizontally. The blocks move up to carry the containers and lift them off the supports 32 to a small extent, move horizontally to bring the containers to the next step, and then move back down again to rest the containers on the supports and to return to their initial position, under other containers.

The choice of a group of four containers is merely an example, and that is why the present texts refers more generally to a group of at least two containers. In addition, conventionally, a row of containers that is transverse to the advance direction F comprises more than two containers, e.g. eight containers. Thus, even for groups of four containers, a holding plate 38 can cover two containers in the direction F and cover the entire row in the transverse direction.

Figure 6:
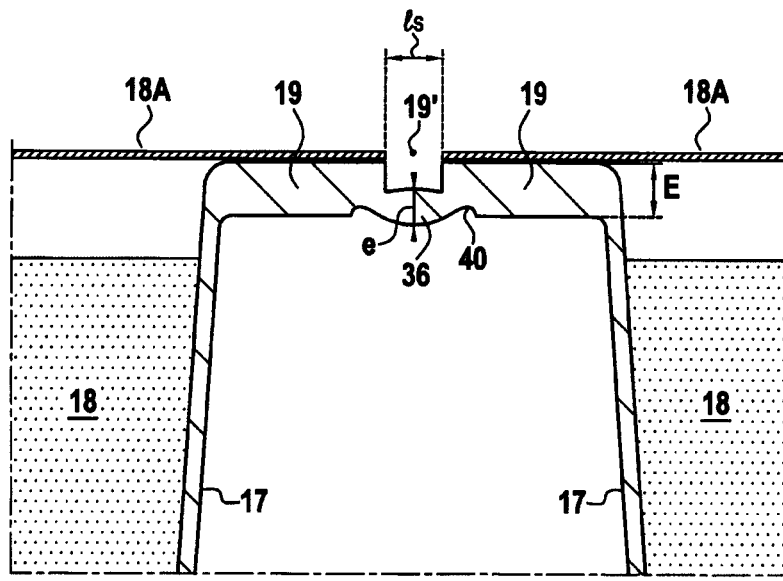
FIG. 6 is a detail view of the zone of the junction between the rims of two adjacent containers, which junction is formed by a spot weld in accordance with the invention, in the situation in which said containers are being transported or stored.

FIG. 6 shows the region of a spot weld between the respective rims 19 of said containers. It can be seen that the spot weld 36 extends over only a fraction of the thickness E of the rims 19. Thus, the thickness e of the spot weld 36 may lie approximately in the range $2/10^{ths}$ of a millimeter to $4/10^{ths}$ of a millimeter, for a thickness E of about 1 mm. In FIG. 6, to make it easier to understand, the width ls of the line of separation 19' is intentionally exaggerated. This difference in thickness can be obtained by appropriately choosing the temperature to which the electrodes heat the material and the time of exposure to that temperature.

As indicated above, the spots welds are advantageously formed by electrodes. Thus, the welding is advantageously performed by locally melting the plastics material, without adding any external material. In addition, FIG. 6 shows the traces 40 of creep of the material due to that local melting.

Figure 7:
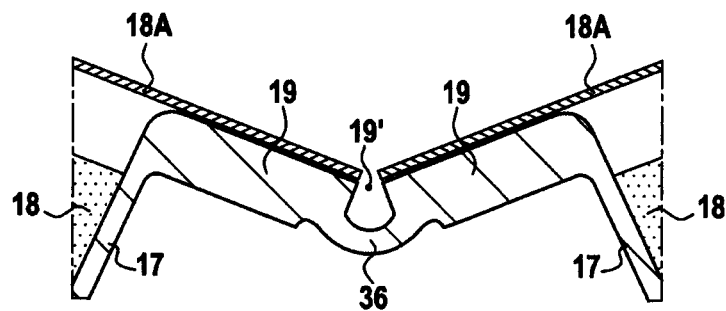
FIG. 7 is a view corresponding to the FIG. 6 view, at the time at which two adjacent containers are being separated.

In FIG. 7, the two containers 18 are being separated. For this purpose, they are folded towards each other about the line of separation 19'. This folding takes place naturally in the direction in which the respective lids 18A of the containers 18 move towards each other. During this movement, the spot weld 36 is subjected to large traction stresses, in particular since the edge faces of the facing rim segments can touch, thereby generating a lever effect. Since, as indicated above, the thickness of the spot welds is small and their general dimensions are small, the material making up the spot welds breaks under the effect of these traction stresses, so that the containers can be separated.

The plastics material in which the containers are thermoformed is advantageously polypropylene, which is a material that offers good protection of the contents of the containers (it offers a barrier to water vapor that is greater than the barrier offered by polystyrene), and is easy to recycle. In addition, the cost of polypropylene is less than the cost of polystyrene. However, unlike polystyrene, polypropylene does not tend to break under the effect of the folding. By forming localized spot welds as described above, the invention nevertheless makes it possible to form grouped-together containers having connections between them that are breakable, thereby enabling them to be used individually. Since the spot welds are added to containers that are initially separate, the forces involved are not merely folding forces, but rather they are also traction forces, which make it possible to achieve the desired breaking.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

We claim:

1. A method of forming, filling, and sealing a group of at least two containers made of plastics material, the method comprising:
    thermoforming containers from the same sheet of plastics material, each container comprising a body and a rim that defines an opening;
    filling the containers;
    subsequently closing the containers by placing lids across their openings; and
    subsequently separating the containers by cutting them out individually from the sheet;
    wherein, after the containers have been separated, the method further comprises:
        placing the containers adjacent to one another in such a manner that peripheral edges of segments of their respective rims face each other and define between them a line of separation between the adjacent containers; and
        forming at least one spot weld on the line of separation, the at least one spot weld forming a breakable connection between the peripheral edges of the facing rim segments.

2. A method according to claim 1, wherein, with the rim of each container defining an opening, the at least one spot weld is formed on the line of separation between the adjacent containers, from those faces of the rims of the containers that face in the direction that is opposite from the direction in which their openings face.

3. A method according to claim 1, wherein at least two spot welds are formed in a spaced-apart manner on the line of separation.

4. A method according to claim 1, wherein the spot weld extends over only a fraction of the thickness of the facing rims.

5. A method according to claim 1, wherein the spot weld is formed by locally melting the plastics material.

6. A method according to claim 1, wherein the plastics material comprises polypropylene.

7. A method according to claim 1, wherein the lids are membrane seals placed over the openings of the containers in a continuous strip, and wherein the seals are cut out while the containers are being separated.

8. An installation for forming, filling, and sealing containers, the installation comprising:
    a thermoforming station suitable for thermoforming containers from a sheet of plastics material, each container comprising a body and a rim that defines an opening;
    a conveyor for conveying the thermoformed containers in groups of at least two adjacent containers connected together via a portion of the sheet;
    a filling station for filling the containers;
    a sealing station for closing the containers, the sealing station being downstream from the filling station in the direction in which the containers are conveyed; and a cutting station suitable for cutting out the containers individually from the sheet so as to separate them, the cutting station being downstream from the sealing station in the direction in which the containers are conveyed;

wherein, downstream from the cutting station in the direction in which the containers are conveyed, the installation further comprises means for placing the adjacent containers of the group in such a manner that peripheral edges of segments of their respective rims face each other and define between them a line of separation between the adjacent containers; and wherein the installation further comprises a welding tool suitable for forming at least one spot weld on the line of separation, the at least one spot weld forming a breakable connection between the peripheral edges of the facing rims.

9. An installation according to claim 8, comprising at least one welding electrode and means for applying the electrode against those faces of the rims of the containers that face in the direction opposite from the direction in which their openings face.

10. An installation according to claim 9, comprising at least two welding electrodes that are spaced apart.

11. An installation according to claim 8, comprising means for maintaining the groups of containers separate in such a manner that, for each group, the facing rims of the containers are accessible via their faces that face in the direction opposite from the direction in which the openings of the containers face.

12. An installation according to claim 8, wherein the lids are membrane seals placed over the openings of the containers in a continuous strip, and wherein the cutting station is suitable for cutting out the seals while the containers are being separated.

* * * * *